(12) United States Patent
Engel

(10) Patent No.: US 10,808,758 B2
(45) Date of Patent: Oct. 20, 2020

(54) COORDINATE MEASURING APPARATUS WITH AIR BEARING MONITORING AND ADJUSTING CAPABILITY

(71) Applicant: Carl Zeiss Industrielle Messtechnik GmbH, Oberkochen (DE)

(72) Inventor: Thomas Engel, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 322 days.

(21) Appl. No.: 15/797,508

(22) Filed: Oct. 30, 2017

(65) Prior Publication Data

US 2018/0066704 A1 Mar. 8, 2018

Related U.S. Application Data

(63) Continuation of application No. PCT/EP2016/059705, filed on Apr. 29, 2016.

(30) Foreign Application Priority Data

Apr. 30, 2015 (DE) ........................ 10 2015 106 831

(51) Int. Cl.
*F16C 32/06* (2006.01)
*G01B 5/00* (2006.01)
*G01B 5/008* (2006.01)

(52) U.S. Cl.
CPC ........ *F16C 32/0614* (2013.01); *G01B 5/0002* (2013.01); *G01B 5/008* (2013.01); *F16C 2233/00* (2013.01)

(58) Field of Classification Search
CPC .... G01B 5/008; G01B 11/005; G01B 21/045; G01B 21/042; G01B 21/047; G01B 21/04; G01B 11/007; G01B 11/24
(Continued)

(56) References Cited

U.S. PATENT DOCUMENTS 4,928,396 A 5/1990 Raleigh
5,189,624 A * 2/1993 Barlow ................ G05B 19/182
700/169

(Continued)

FOREIGN PATENT DOCUMENTS

DE 69000408 T2 5/1993
DE 20118421 U1 3/2002
(Continued)

OTHER PUBLICATIONS

International Search Report dated Jul. 6, 2016 of international application PCT/EP2016/059705 on which this application is based.
(Continued)

*Primary Examiner* — Yaritza Guadalupe-McCall
(74) *Attorney, Agent, or Firm* — Falk Ewers; Ewers IP Law PLLC

(57) ABSTRACT

A coordinate measuring apparatus is provided having at least one measuring system and at least one support structure on which the measuring system is disposed, wherein the measuring system is displaceably mounted in the support structure and/or the support structure is displaceably mounted, and wherein the coordinate measuring apparatus includes an air bearing arrangement for mounting two components to be movable relative to one another. The air bearing arrangement includes at least one air bearing which provides a compressed air cushion between the components, wherein the air bearing has at least one compressed air supply line by way of which the compressed air can be provided, wherein a flow rate meter by way of which the flow rate of compressed air to the air bearing can be detected is provided in the compressed air supply line.

12 Claims, 3 Drawing Sheets

(58) Field of Classification Search
USPC .......................................................... 33/503
See application file for complete search history.

(56) References Cited

U.S. PATENT DOCUMENTS

| | | | | |
|---|---|---|---|---|
| 8,103,153 | B2* | 1/2012 | Uhl | G01B 21/04 |
| | | | | 318/560 |
| 8,590,875 | B2* | 11/2013 | Stumpp | B23Q 1/38 |
| | | | | 269/71 |
| 9,671,210 | B2* | 6/2017 | Sagemueller | G01B 21/042 |
| 9,772,181 | B2* | 9/2017 | Seitz | G01B 21/042 |
| 10,060,737 | B2* | 8/2018 | Bernhardt | G01B 5/008 |
| 10,145,664 | B2* | 12/2018 | Grupp | G01B 21/04 |
| 10,302,129 | B2* | 5/2019 | Poglitsch | F16C 43/02 |
| 10,451,397 | B2* | 10/2019 | Matzkovits | G01B 21/047 |
| 10,466,029 | B2* | 11/2019 | Fuchs | G01B 5/0016 |
| 2013/0181387 | A1 | 7/2013 | Stumpp | |
| 2016/0040987 | A1 | 2/2016 | Bernhardt et al. | |
| 2019/0072373 | A1* | 3/2019 | Iseli | G01B 21/047 |

FOREIGN PATENT DOCUMENTS

| | | |
|---|---|---|
| DE | 10229823 A1 | 1/2004 |
| DE | 102005050108 A1 | 4/2007 |
| DE | 102008024062 A1 | 11/2009 |
| WO | 2011089222 A1 | 7/2011 |
| WO | 2014161568 A1 | 10/2014 |

OTHER PUBLICATIONS

Office Action issued in German Patent Application No. DE 10 2015 106 831.1 (from which this application claims priority), dated Jan. 12, 2016 and English language translation thereof.

International Preliminary Report on Patentability of the European Patent Office in PCT/EP2016/059705 (from which this application claims priority) dated Jul. 6, 2016 and English-language translation thereof.

* cited by examiner

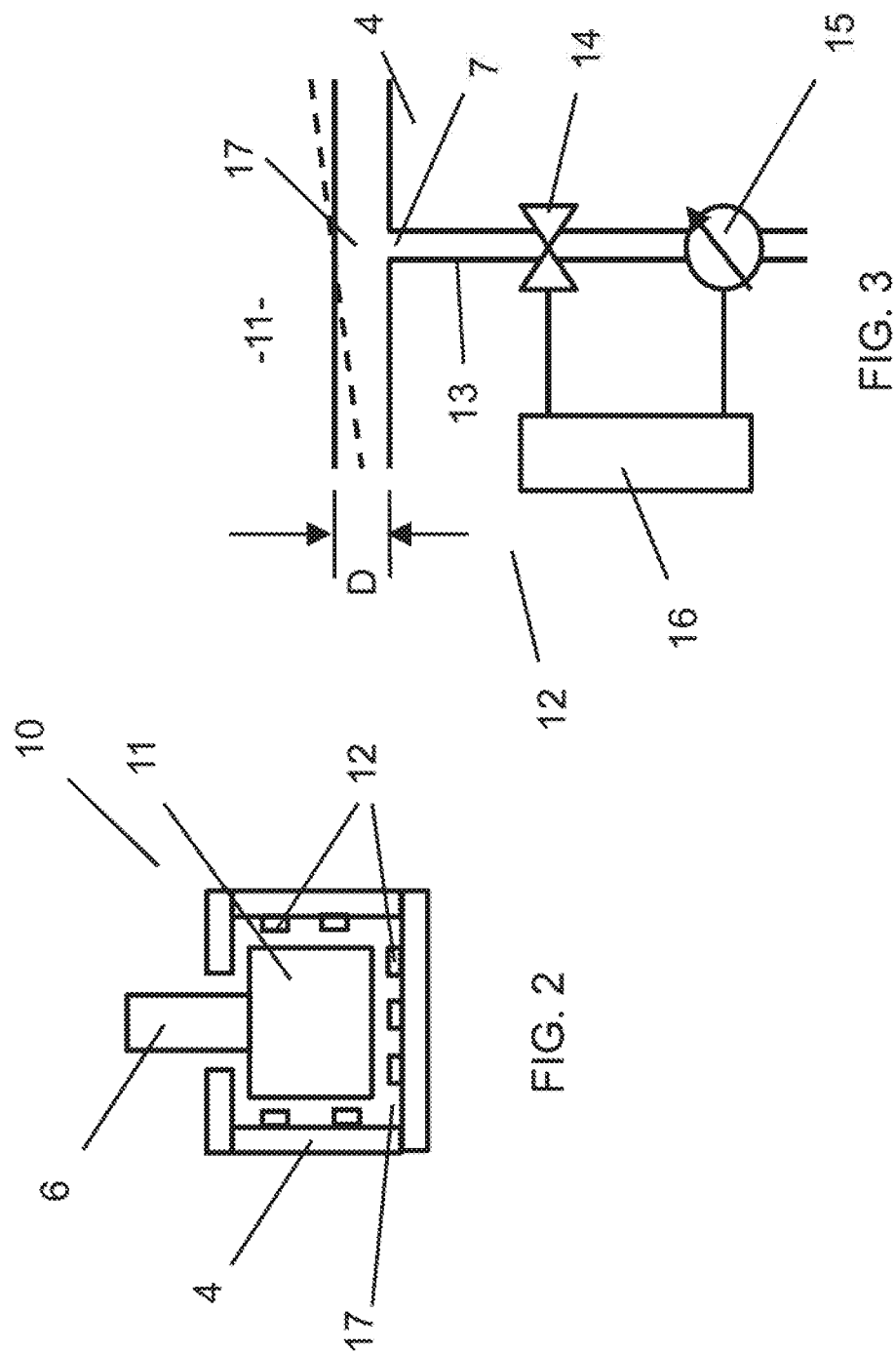

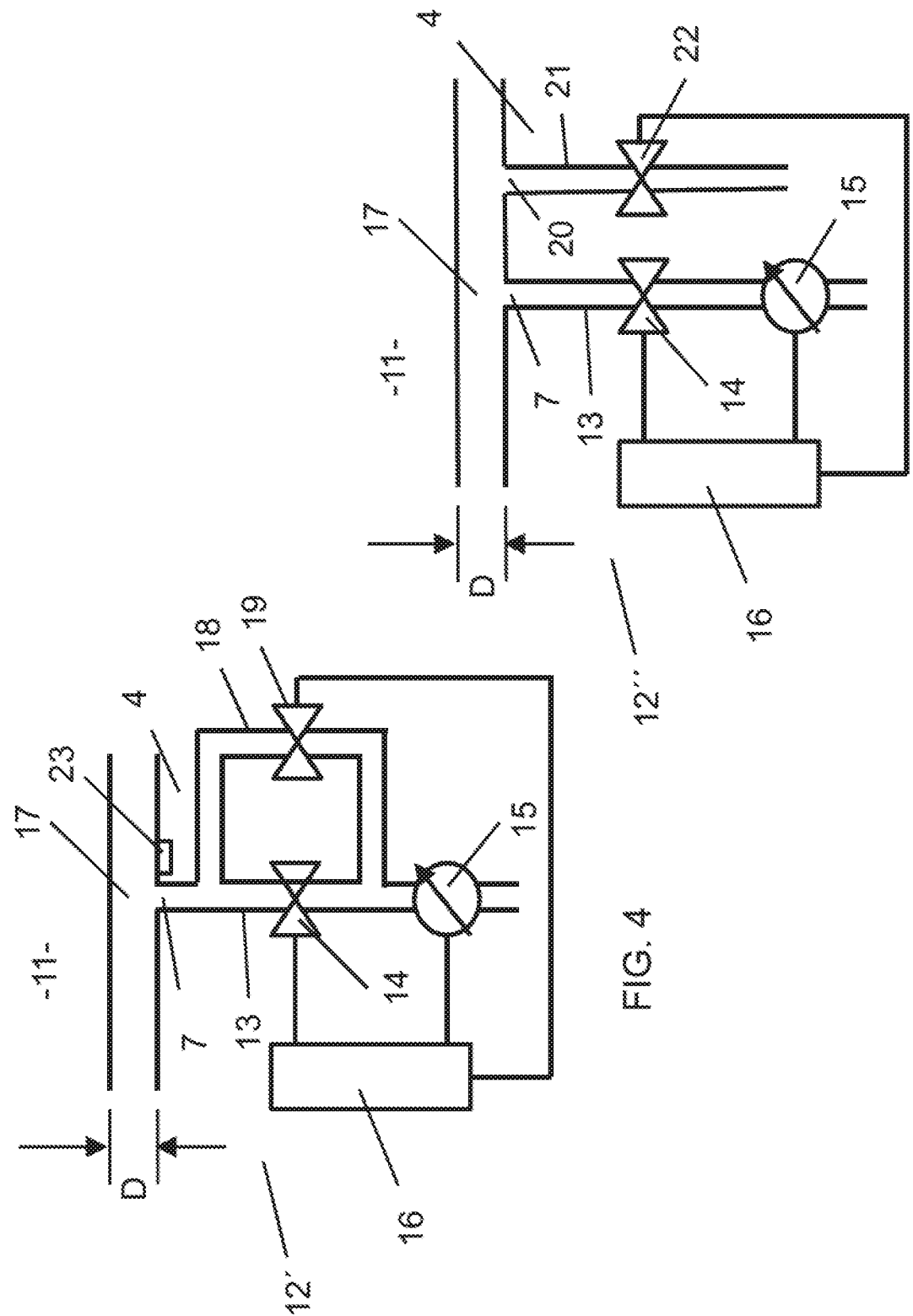

COORDINATE MEASURING APPARATUS WITH AIR BEARING MONITORING AND ADJUSTING CAPABILITY

CROSS REFERENCE TO RELATED APPLICATIONS

This application is a continuation application of international patent application PCT/EP2016/059705, filed Apr. 29, 2016, designating the United States and claiming priority to German patent application 10 2015 106 831.1, filed Apr. 30, 2015, and the entire content of both applications is incorporated herein by reference.

TECHNICAL FIELD

The present invention relates to a coordinate measuring apparatus with an air bearing arrangement having at least one air bearing for mounting two components to be movable relative to one another. By utilizing compressed air, the at least one air bearing provides a compressed air cushion (an aerostatic air bearing) between the components that are movable relative to one another. The present invention further relates to a method for operating a corresponding coordinate measuring apparatus.

BACKGROUND

It is necessary for workpieces to be exactly measured in production, for example for the purpose of quality assurance, and for the dimensions and/or shapes of the workpieces to be determined. For this purpose, coordinate measuring devices which can determine coordinates of a workpiece to be measured by optical and/or tactile sensors (contact sensors) are employed. A measuring head having a corresponding sensor is displaced in space in a three-dimensional manner in order for the workpiece that is mounted in the measuring space to be measured. An example of a coordinate measuring device of this type is described in the German patent application publication DE 10 229 823 A1.

To be able to carry out highly precise measurements by coordinate measuring devices of this type, the movable components of the coordinate measuring device that are required for moving the sensor in the three-dimensional space must be mounted in a likewise highly precise manner. To this end, it is known to use air bearings in which the components to be mounted, and in particular also the components to be mounted to be movable relative to one another, are disposed spaced apart by an air gap therebetween provided by a compressed air cushion, for example. A corresponding air gap between components that are mounted to be movable relative to one another can be in the range of a few micrometers in terms of the gap thickness.

In the case of dynamic stresses of a respective aerostatic air bearing in which, in order for the air gap to be generated, compressed air or another gas is injected into the intermediate space of the parts to be mounted, a reduction in the air gap up to a failure of the air bearing can arise, which can result in a contact between the mounted components. This however can cause damage to the mounted components.

For example, in the case of a coordinate measuring device in which the sensor or the measuring head, respectively, or the measuring system, is disposed so as to be movable in or by way of a support structure, and in which the respective movable components are mounted by air bearings, for example, the rapid displacement of the components of the support structure in the local readjustment of the measuring system from one measuring position to the other can cause corresponding dynamic stresses to the air bearings between the movable components such that the air cushion can collapse at least for a brief moment and mutual contact between the mounted components can take place when the dynamic stress exceeds a specific limit value. This can not only cause extensive damage to the participating components, but can also result in consequential damage to the measuring system, and the measurement result can also be compromised.

Accordingly, care has to be taken to limit the dynamic stresses of the air bearing in order for such damage to be avoided in the case of displaceable components of a support structure of a coordinate measuring device that are mounted by air bearings. As a result, the displacement speed at which the support structure of the measuring system can be moved, or at which the measuring system can be moved in the support structure, must be likewise limited, which compromises the performance of a respective coordinate measuring device in terms of the measuring speed.

SUMMARY

It is therefore an object of the present invention to provide a coordinate measuring apparatus having at least one air bearing arrangement, which avoids or at least minimizes the disadvantages of the related art. In particular, a respective air bearing arrangement, or a respective coordinate measuring apparatus are provided to enable a more rapid movement of displaceable components without dynamic stresses generated on account thereof that may lead to a failure of the air bearing. Moreover, the respective air bearing arrangement and the coordinate measuring apparatus have a simple design and are operable in a simple manner to guarantee a reliable operation under diverse operating conditions.

This object is achieved by the subject matter disclosed herein.

To improve the handling of dynamic stresses of air bearings in coordinate measuring apparatuses, a permanent or temporary monitoring of a respective air bearing is performed by determining the flow rate of compressed air that is fed to the air bearing. By acquiring the flow rate of compressed air through at least one compressed air supply line of the air bearing, the operating state of the air bearing, or of a coordinate measuring apparatus having a respective air bearing arrangement can be detected such that a suitable adjustment of the air bearing can be performed based on the detected operating state.

By detecting the flow rate of the compressed air in the case of an only temporary monitoring of the air bearing of an air bearing arrangement, a reference value can be determined for a specific operating state, or a characteristic curve can be acquired for a series of operating states, said reference value or said characteristic curve being able to be used as the basis for the later operation of the air bearing or of a respective device having an air bearing of this type, e.g., of a coordinate measuring apparatus.

In the case of a permanent monitoring of the air bearing or of the air bearing arrangement, respectively, the current operating state can be determined, and a variation in the adjustment of the air bearing or of the coordinate measuring apparatus that uses the air bearing, respectively, can be performed depending on the current operating state.

According to a first aspect of the present invention, an air bearing arrangement is provided for mounting components to be movable relative to one another, such as for example movable components of a support structure for a measuring system of a coordinate measuring apparatus, in which an air bearing arrangement having at least one air bearing is provided, in particular an aerostatic air bearing which is provided with compressed air and which is monitored by at least one flow rate meter which can detect the flow rate of compressed air to the air bearing. The flow rate meter detects the amount of compressed air per unit of time that is made available to the air bearing and accordingly escapes from the air bearing. The flow rate of compressed air varies in the case of variations in the operating conditions of the air bearing, such that conclusions pertaining to the operating state of the air bearing, or of the coordinate measuring apparatus which uses a corresponding air bearing or an air bearing arrangement, respectively, can be drawn by detecting the flow rate by the flow rate meter.

Moreover, the air bearing arrangement can have at least one pressure sensor in the air bearing, i.e., in the region of the air gap that is formed in the air bearing, to determine the pressure conditions in the air bearing. The local pressure conditions in the air bearing can also vary depending on variations in the operating conditions such that an additional indicator for the operating conditions of the air bearing and for an arrangement that uses the air bearing is provided by the determination of the air pressure. The additional indicator in particular in combination with the detected flow rate of compressed air is able to provide information pertaining to the operating state.

Since the air pressure in the air bearing can vary in terms of location and/or time, and the variation of the air pressure can provide information pertaining to an operating state, the at least one pressure sensor can be configured as a differential pressure sensor which detects pressure variations.

The pressure sensor can be disposed in a location in the air bearing where respective pressure variations are to be expected in the case of critical operating states. Of course, a plurality of pressure sensors can also be disposed at various locations of an air bearing to determine the local pressure conditions that vary.

The at least one pressure sensor can also be installed in an aligned manner, to be specifically oriented, in the air bearing, to determine the pressure prevalent in a particular direction in the air bearing by the main sensor direction of the pressure sensor. This can be advantageous when the stress on the air bearing or on the air bearing arrangement does not arise in a symmetrical manner, or when the air bearing, or the air bearing arrangement has an asymmetrical design.

The air bearing arrangement can include a control and/or feedback control system which is connected to the flow rate meter and optionally to a pressure sensor, such that the control and/or feedback control system can obtain data pertaining to the flow rate or to the pressure, respectively, from the flow rate meter and from the pressure sensor that is optionally provided. The control and/or feedback control system can have a corresponding evaluation unit by way of which the acquired flow rate data of the flow rate meter, or the pressure data of the pressure sensor, respectively, can be evaluated. Moreover, the control and/or feedback control system can have a non-transitory computer-readable storage medium configured to store respective data and/or evaluation results.

The compressed air supply line for supplying the at least one air bearing of the air bearing arrangement with compressed air can have at least one valve for adjusting the compressed air supply, wherein the valve is adjustable by the control and/or feedback control system, such that the control and/or feedback control system can be connected to the valve in a corresponding manner.

The adjustment capability, in particular by the control and/or feedback control system, of the valve in the compressed air supply line of the air bearing, permits the compressed air supply to be varied and, on account thereof, the gap thickness of the air gap between the parts mounted by the air bearing can be adjusted in a corresponding manner. On account of the provision of the control and/or feedback control system, the adjustment of the air bearing and in particular of the valve that is provided in the compressed air supply line can be performed in an automated manner by virtue of an operating state that has been established by the control and/or feedback control system.

In order to enable variation of the compressed air supply for special operating conditions in a manner that is independent of the basic adjustment of the compressed air supply, a bypass which can be opened or closed by a shut-off element, or which can be adjusted by a valve in terms of the potential flow rate of compressed air, can be provided in parallel with a valve in the compressed air supply line. Accordingly, the bypass can be opened in a suitable manner on demand, i.e., when it is determined that there is a higher requirement in terms of the compressed air supply to the air bearing. To this end, the shut-off element and/or the valve of the bypass in turn can each be connected to the control and/or feedback control system.

In order for the compressed air supply to be varied as required in the case of special operating conditions, the air bearing arrangement can have at least one auxiliary air bearing and/or at least one auxiliary air nozzle, the former and the latter being able to be disposed additionally to one or a plurality of main air bearings and/or main air nozzles of an air bearing arrangement. A main air bearing is understood to be a bearing which in the operation of an air bearing arrangement always provides compressed air, while an auxiliary air bearing in the operation of an air bearing arrangement provides compressed air not at all times but only in particular situations. This applies in an analogous manner to main air nozzles and auxiliary air nozzles, wherein the main air nozzles in the operation of an air bearing arrangement always dispense compressed air into the air gap between the components to be mounted, while an auxiliary air nozzle does so only temporarily on demand. In a manner analogous to that of the afore-described bypass arrangement, it can be achieved on account thereof that respective compressed air can be provided by the auxiliary air bearing or the auxiliary air nozzle in the case of an increased demand in compressed air. Accordingly, in each case one valve and/or shut-off element can also be assigned to the auxiliary air bearing or to the auxiliary air nozzle, such that the auxiliary air bearing and/or the auxiliary air nozzle by way of the shut-off element can either be fully switched on or off, or by way of the valve can be switched on in a variably adjustable manner.

Accordingly, a coordinate measuring apparatus which has at least one air bearing arrangement of the type described above is claimed. The one or the plurality of air bearing arrangements of the coordinate measuring apparatus can preferably be used in the mounting of displaceable components of a support structure for a measuring system.

The control and/or feedback control system of the air bearing arrangement can be integrated in a control and/or feedback control system of the coordinate measuring apparatus, or can be connected to the latter in a suitable manner, in order for information pertaining to the operating state of the coordinate measuring apparatus to be generated and/or processed, wherein both information pertaining to the general operating state of the coordinate measuring apparatus, such as, for example, operating commands that have been entered, can be used for adjusting the air bearing or air bearings of the air bearing arrangement, and information pertaining to the operating state of one or a plurality of air bearings of the air bearing arrangement can be used for operating the coordinate measuring apparatus.

An operating state of the coordinate measuring apparatus, and in particular of an air bearing arrangement, can thus be determined by at least one control and/or feedback control system, said operating state in turn being able to be used for adjusting the air bearing arrangement.

For example, in the case of a coordinate measuring apparatus, it can be possible for a differentiation to be made between a pure travelling operation and a measuring operation, wherein lower travel speeds are used in the case of the latter. An improved operational reliability can be achieved by assigning a respective operating state of the coordinate measuring apparatus to specific operating states of the air bearing or air bearings, in that an increased compressed air supply can be provided in the case of rapid travel, for example by way of an additional air supply by way of auxiliary air bearings and/or auxiliary air nozzles.

Maintenance can also be improved on account of the monitoring of the air bearing arrangement, or of the air bearings, respectively, and on account of the storage of the detected data, since critical states can be identified and taken into account, for example.

Accordingly, an air bearing arrangement having at least one air bearing may be operated such that the flow rate of compressed air to the air bearing is detected, and the at least one air bearing is adjusted so as to depend on the flow rate detected. If pressure measuring is additionally provided in the air bearing, the values of the pressure measurements can thus be conjointly considered in addition to the flow rate measurements. This applies in general to all aspects of the present invention, even if this is not expressly described.

The adjustment of the air bearing arrangement, or of the air bearing or air bearings, respectively, herein based on a detected flow rate of compressed air and optionally based on a pressure value can relate to the basic adjustment by way of which the air bearing arrangement or the air bearing is operated, that is to say to the adjustment of the air gap thickness between the components to be mounted. This can be performed by a detected reference value for the flow rate in the case of a predefined operating state, or based on a characteristic curve for various operating states. The measured data for tuning or adjusting the air bearing or air bearings can be utilized both in the assembly as well as in the maintenance, or in the case of adjustments during the operation.

Alternatively, or additionally, a situation-relevant adjustment of the air bearing arrangement or of the air bearings can be performed, said situation-relevant adjustment on the one hand being based on stored operating procedures and the associated adjustments of the air bearing which have been detected based on the detected flow rates of a flow rate meter and optionally based on the pressure measured in the air bearing. On the other hand, the situation-relevant adjustment of the air bearing arrangement, or of the air bearing or the air bearings, can be performed based on currently established operating states by virtue of the detected flow rate of compressed air and of the optionally detected pressure in the air bearing.

Accordingly, in a method for operating a coordinate measuring apparatus, for which protection is likewise claimed separately and independently of as well as in combination with other aspects of the present invention, an adjustment of the air bearing arrangement may be performed by operating states of the coordinate measuring apparatus. The operating states can be determined either according to the description above pertaining to the operation of an air bearing arrangement, by detecting the flow rate of the compressed air, or by a flow rate meter, or the operating state can be determined by virtue of other parameters of the coordinate measuring apparatus, such as based on operating commands for the coordinate measuring apparatus, for example, wherein stored adjustments for the compressed air supply are then applied in the latter case.

If by virtue of the operating state acquired, there is a risk of the dynamic stress on the air bearing or on the air bearing arrangement, respectively, being so high that at least a partial collapse of the air cushion is to be expected, the respective compressed air supply to the air bearing can be increased.

For example, a critical operating state can be recognized from the command input for adjusting the measuring system and from the adjustment speed defined therefor, such that a corresponding increase in the compressed air supply is adjusted to avoid the failure of the air bearing.

By contrast, the compressed air supply can be increased in the case of a currently ongoing monitoring of an air bearing if it is determined that the flow rate that is detected by the flow rate meter increases such that there is a risk of the compressed air escaping from the compressed air gap.

BRIEF DESCRIPTION OF THE DRAWINGS

The invention will now be described with reference to the drawings wherein:

FIG. 2 shows in detail a sectional illustration of an air bearing of the coordinate measuring apparatus from FIG. 1;

FIG. 3 shows an illustration of an air bearing arrangement according to a first exemplary embodiment of the invention;

FIG. 4 shows an illustration of an air bearing arrangement according to a second exemplary embodiment of the invention; and FIG. 5 shows an illustration of an air bearing arrangement according to a third exemplary embodiment of the invention.

DESCRIPTION OF EXEMPLARY EMBODIMENTS

Figure 1:
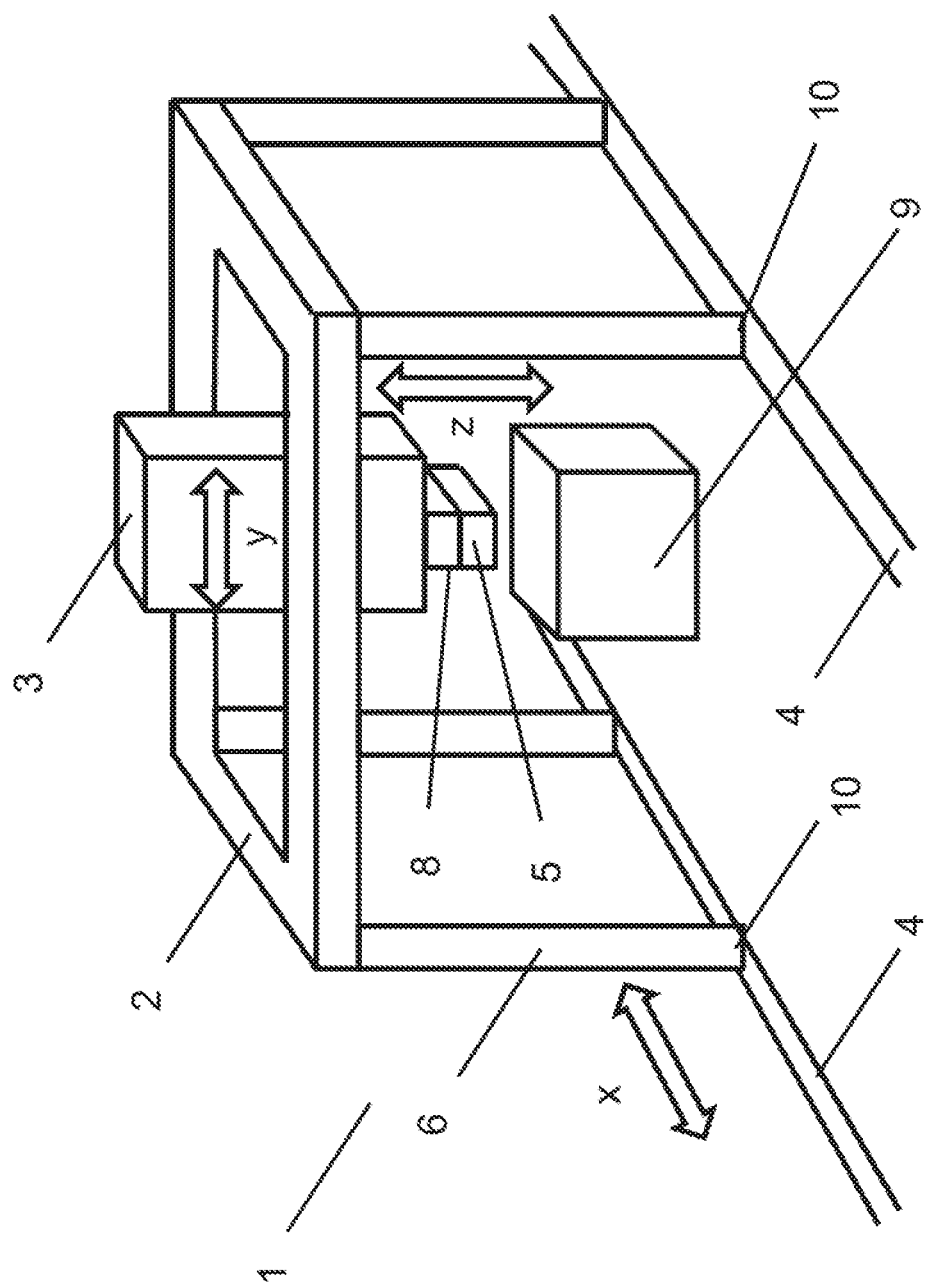
FIG. 1 shows an illustration of a coordinate measuring apparatus.

Further advantages, characteristics, and features of the invention will become clear from the following description of the exemplary embodiments. However, the invention is not limited to these exemplary embodiments.

FIG. 1 shows a coordinate measuring apparatus 1 according to an exemplary embodiment of the present invention. The coordinate measuring apparatus 1 includes a support structure with a movable gantry support 2, in which a carriage 3 is movably arranged. A measuring system 5 is arranged in a vertically movable mount 8 on the carriage 3. The measuring system 5 can have at least one non-contacting, for example optical, capacitive or inductive sensor, and/or at least one tactile sensor, by way of which an object 9 to be measured can be sensed. In the case of an optical sensor, this can take place in a non-contacting manner, while with a tactile sensor the dimensions and/or shape of the object 9 to be measured is/are achieved by corresponding contact with the object 9 to be measured.

The gantry support 2 is movable along a rail arrangement including rails 4, the longitudinal extent of the rails 4 corresponding to the X direction, so that the measuring system 5 can be adjusted in the X direction by moving the gantry support 2 along the rails 4. The carriage 3 can be moved in the gantry support 2 in a direction transverse to the X direction, namely in the Y direction. In addition, a movement of the measuring system 5 with the mount 8 is possible, which is vertically movable in the carriage 3 perpendicularly in relation to the plane defined by the X and Y directions, so that the measuring system 5 can be moved along the coordinate axes X, Y, and Z to any desired point in the measuring space defined by the coordinate measuring apparatus 1.

The mounting and guidance of the movable components of the support structure, i.e., of the gantry support 2 and of the carriage 3 and of the mount 8 of the measuring system 5, is at least in part implemented by air bearings in the case of which a gap having a compressed air cushion is generated by compressed air between two movable parts.

This is shown in an exemplary manner in FIG. 2 for the air bearing arrangement 10 by which the columns 6 of the gantry support 2 are disposed to be displaceable in the rails 4.

Accordingly, by utilizing air bearing arrangements, the carriage 3 can be disposed to be displaceable along the longitudinal beam of the gantry support 2, and, accordingly, the mount 8 can be disposed to be displaceable in the carriage 3 by utilizing air bearing arrangements. Therefore, the illustration of FIG. 2, having the air bearing arrangement 10, is purely exemplary.

The air bearing arrangement 10 is arranged in the rail 4, to hold and guide a guide element 11 in a manner spaced apart from the rails 4 by an air cushion. The guide element 11 is arranged on column 6 of the gantry support 2.

The air bearing arrangement 10 can include a plurality of air bearings 12, wherein each air bearing can include one or a plurality of air nozzles by which the compressed air for generating the air gap 17 between the rail 4 and the guide element 11 is pressed into the intermediate space between the rail 4 and the guide element 11. To this end, each air nozzle 7 can have a dedicated compressed air supply line 13, or a plurality of air nozzles 7 can be disposed on one compressed air supply line 13.

FIG. 3 in an exemplary manner shows an air bearing 12 having an air nozzle 7 which is disposed on a compressed air supply line 13 and configured to blow compressed air into the gap 17 between a first component (rail 4) and a second component (guide element 11).

A valve 14 by which the inflow of compressed air to the air nozzle 7 can be adjusted is disposed in the compressed air supply line 13. In the case of otherwise unchanged conditions, the thickness D of the air gap 17 which is provided between the rail 4 and the guide elements 11 by the compressed air can be adjusted by the valve 14. If the valve 14 is opened, the compressed air bearing on the compressed air supply 13 can flow into the intermediate space between the rail 4 and the guide element 11. Depending on how far the valve 14 is opened, more or less compressed air can flow into the air gap 17 in the case of a constant supply pressure. If the valve 14 is fully opened, the air pressure present in the air gap 17 is almost identical to the supply pressure in the compressed air supply line 13. If the valve is adjusted such that the flow cross section of the compressed air through the valve 14 is decreased, less compressed air can flow into the gap 17 in the case of a maintained supply pressure in the compressed air supply line 13, and the air pressure in the air gap 17 drops such that the air gap thickness D decreases in the case of otherwise maintained weight or stress conditions, respectively. Accordingly, the air gap thickness D can be adjusted using the valve 14.

If the conditions vary during the operation of the air bearing 12, for example on account of a variation of the load, a variation in the air gap thickness D can result in the case of a maintained compressed air supply.

In the case of the coordinate measuring apparatus shown in FIG. 1, corresponding dynamic stresses can arise when the components that are mounted by the air bearing are rapidly displaced in relation to one another. Dynamic stresses of this type may result in tipping of the mutually mounted components, that is for example tipping of the guide element 11 toward the rail 4, such that the air gap 17, as is indicated by the dashed line in FIG. 3, is no longer configured in a uniform manner between the rail 4 and the guide element 11, and a different air gap thickness D is present instead. On account thereof, an out-flow of the air cushion can arise in the region in which the air gap thickness D is comparatively large, such that there is the risk that the guide element 11 comes into contact with the guide rail 4, which can result in corresponding damage.

To detect such a condition, a flow rate meter 15 is provided in the compressed air supply line 13 which can detect the amount of compressed air flowing therethrough per unit of time.

The flow rate meter 15 is connected to a control and/or feedback control system 16 which is also connected to the valve 14. The control and/or feedback control system 16 receives the information pertaining to the flow rate that has been detected by the flow rate meter 15, and can vary the adjustment of the valve 14 based on the detected flow rate. For example, if a dynamic stress of the air bearing 12 is caused by a rapid displacement movement of the gantry support 2, such that an outflow of the air cushion in the air gap 17 as a result of the guide element 11 tipping relative to the rail 4, the flow rate of the compressed air through the compressed air supply line 13 will be increased. It can thus be established by the flow rate meter 15 that the flow rate of compressed air has increased. Based on this determination, which can be made by an evaluation unit of the control and/or feedback control system 16, the control and/or feedback control system 16 opens the valve 14 further such that more compressed air can flow into the air gap 17 to prevent the guide element 11 from coming into contact with the rail 4. As a result, damage to the air bearing that may result from a contact between the guide element 11 and the rail 4 can be prevented.

Moreover, a flow rate meter 15 which in the case of a respective air bearing 12 is disposed in the compressed air supply line 13 can not only be used to avoid critical situations during operation of the air bearing 12. Instead, with the aid of the flow rate meter 15, it is also possible to make basic adjustments to the air bearing 12, and to valve 14 provided therein.

For example, a reference value for a specific operating situation of the air bearing 12, or of the coordinate measuring apparatus 1, can be detected by the flow rate meter 15, in which operating situation the air bearing 12 has a specific thickness D of the air gap 17. If the air bearing 12 is to be operated at a modified air gap thickness D, the latter can be adjusted simply by varying the flow rate that is detected by the flow rate meter 15 relative to a reference value. In this context, it is also possible to record characteristic curves, which describe a correlation between the flow rate of compressed air as detected by the flow rate meter 15, and the adjusted gap thickness D to adjust the gap thickness D corresponding to the characteristic curve by adjusting the flow rate through the flow rate meter 15.

The flow rate meter 15 does not have to be disposed permanently in the compressed air supply line 13 but can be provided or connected, respectively, on demand for the described adjustment purposes of the air bearing 12.

Moreover, it is also possible to carry out specific operating procedures of the air bearing 12 or of the coordinate measuring apparatus 1, and to measure the flow rates by the flow rate meter 15 that are established during the operating procedures such that specific adjustments of the valve 14, or of the air bearing 12, respectively, can be made in accordance with the corresponding operating procedures that take place in a repetitive manner. This means that adjustments of the air bearing or of the valve 14, respectively, can be made for individual, in particular repetitive operating procedures, which either are fixed across the entire temporal profile of the respective operating procedure, or are variable for specific operating procedures across the temporal profile.

For example, in the case of a rapid displacement of the gantry support 2 along the rail 4 during accelerations, a higher flow rate can be set for the compressed air supply on the valve 14, while the flow rate in the case of a displacement at a constant speed is reduced by the valve 14 and is increased again in the deceleration procedure. Of course, other temporal profiles of the air bearing adjustments or valve adjustments, respectively, are also possible, depending on the application case.

Based on the constant or variable adjustments for the air bearing 12, or for the valve 14 provided therein, respectively, that are stored in this manner, the respective adjustments can already be made, or the sequence of the adjustments can already be implemented, respectively, by the control and/or feedback control system 16, when the commands are entered by a user. For example, the control and/or feedback control system 16 can acquire an operating command of a user in order for the gantry support 2 to be adjusted by a specific distance along the X direction, wherein by virtue of the length of the distance a high displacement speed and high accelerations, respectively, are targeted such that a specific operating procedure is selected, and the adjustment of the air bearing 12 is performed according to the selected operating procedure.

The adjustment of the compressed air supply on the air nozzle 7 in the exemplary embodiment of FIG. 3 is achieved by adjusting the valve 14. In the case of an alternative exemplary embodiment of an air bearing 12', such as the air bearing 12' shown in FIG. 4, a bypass 18 having a further valve 19 or a simple shut-off element can be provided in the compressed air supply line 13, wherein the bypass bypasses the valve 14 such that the compressed air supply to the air nozzle 7 can be varied without changing the adjustment of the valve 14 in that the flow rate through the bypass 18 is modified by the valve 19. For example, if it is determined by virtue of the detected flow rate that has been established by the flow rate meter 15 that the amount of compressed air that is made available on the air nozzle 7 has to be increased, the control and/or feedback control system 16 can increase the amount of compressed air without modifying valve 14, in that the valve 19 in the bypass 18 is regulated. Accordingly, the control and/or feedback control system 16 is also connected to the valve 19 in the bypass 18 such that an adjustment of the valve 19 can be made by the control and/or feedback control system 16.

Moreover, a pressure sensor 23 which can measure the pressure in the air gap 17 and can transmit the detected measured value to the control and/or feedback control system 16 is additionally provided in the exemplary embodiment shown in FIG. 4. The detected pressure can be utilized in addition to the flow rate, in the same manner as the acquired flow rate.

FIG. 5 shows a further exemplary embodiment of an air bearing 12" according to the invention, wherein an auxiliary air nozzle 20 which is connected to a separate compressed air supply line 21 is provided apart from the air nozzle 7. The air nozzle 7 in the case of the exemplary embodiment shown of FIG. 5 represents the main air nozzle, meaning that the air bearing 12 is operated such that the air nozzle 7 in the operation of the air bearing dispenses the compressed air into the air gap 17 to establish the operating state. Compressed air is additionally blown into the air gap 17 through the auxiliary air nozzle 20 only upon demand, for example, when it is determined by the flow rate mater 15 that more compressed air has to be blown into the air gap 17. The control and/or feedback control system 16 can then open a valve 22 which is provided in the compressed air supply line 21 of the auxiliary air nozzle 20, such that additional compressed air can be provided temporarily by way of the auxiliary air nozzle 20.

Although the present invention has been described in detail by way of the exemplary embodiments, it is obvious to a person skilled in the art that the invention is not restricted to these exemplary embodiments but rather that modifications are possible such that individual features can be omitted or different types of combinations of features can be performed, as long as there is no departure from the scope of protection of the appended claims. The present disclosure includes all combinations of the individual features presented.

LIST OF REFERENCE NUMERALS

1 Coordinate measuring apparatus
2 Gantry support
3 Carriage
4 Rail
5 Measuring system
6 Column
7 Air nozzle
8 Mount
9 Object
10 Air bearing arrangement
11 Guide element
12, 12', 12" Air bearing
13 Compressed air supply line
14 Valve
15 Flow rate meter
16 Control and/or feedback control system
17 Air gap
18 Bypass
19 Valve
20 Auxiliary air nozzle
21 Compressed air supply line
22 Valve

What is claimed is:

1. A coordinate measuring apparatus comprising:
at least one measuring system;
at least one support structure in which the at least one measuring system is arranged, wherein at least one of (a) the at least one measuring system is displaceably mounted in the at least one support structure and (b) the at least one support structure is displaceable;
at least one air bearing arrangement configured for mounting two components to be movable relative to one another, the at least one air bearing arrangement including at least one air bearing configured to provide a compressed air cushion between the two components, the at least one air bearing including at least one compressed air supply line configured to provide compressed air; and a flow rate meter arranged in the at least one compressed air supply line and configured to detect a flow rate of the compressed air flowing to the air bearing, wherein the at least one air bearing arrangement includes a control system connected to the flow rate meter and configured to obtain flow rate data relating to the flow rate detected by the flow rate meter, and wherein the at least one compressed air supply line includes at least one of (c) a bypass having a valve and (d) a shut-off element configured to be controllable by the control system.

2. The coordinate measuring apparatus of claim 1, wherein the at least one air bearing arrangement in the air bearing includes at least one pressure sensor configured to detect a pressure in the compressed air cushion, and wherein at least one of (a) pressure values detected by the at least one pressure sensor are evaluated by the control system instead of the flow rate data and (b) pressure values detected by the at least one pressure sensor are evaluated by the control system in combination with the flow rate data.

3. The coordinate measuring apparatus as claimed in claim 1, further comprising:

a valve arranged in the at least one compressed air supply line and configured for controlling a compressed air supply, the valve being controllable by the control system.

4. The coordinate measuring apparatus of claim 1, further comprising:

a control system configured to determine an operating state of the coordinate measuring apparatus.

5. The coordinate measuring apparatus of claim 4, wherein the control system is configured to adjust the air bearing arrangement based on the detected operating state.

6. A coordinate measuring apparatus comprising:

at least one measuring system;

at least one support structure in which the at least one measuring system is arranged, wherein at least one of (a) the at least one measuring system is displaceably mounted in the at least one support structure and (b) the at least one support structure is displaceable;

at least one air bearing arrangement configured for mounting two components to be movable relative to one another, the at least one air bearing arrangement including at least one air bearing configured to provide a compressed air cushion between the two components, the at least one air bearing including at least one compressed air supply line configured to provide compressed air; and a flow rate meter arranged in the at least one compressed air supply line and configured to detect a flow rate of the compressed air flowing to the air bearing, wherein the at least one air bearing arrangement includes a control system connected to the flow rate meter and configured to obtain flow rate data relating to the flow rate detected by the flow rate meter, and wherein the at least one air bearing arrangement includes at least one of an auxiliary air bearing and an auxiliary air nozzle, each having at least one of a valve and a shut-off element configured to be controllable by the control system.

7. A method for operating a coordinate measuring apparatus, the coordinate measuring apparatus including at least one measuring system and at least one support structure in which the at least one measuring system is arranged, wherein at least one of (a) the at least one measuring system is displaceably mounted in the at least one support structure and (b) the at least one support structure is displaceable, at least one air bearing configured for mounting two components to be movable relative to one another, the at least one air bearing being configured to provide a compressed air cushion between the two components, the at least one air bearing including at least one compressed air supply line configured to provide compressed air, the method comprising:

providing a valve configured to control a flow rate of the compressed air and a flow rate meter configured to detect the flow rate of compressed air flowing to the at least one air bearing in a compressed air line to permit the valve to be controlled depending on the detected flow rate;

and providing a control system configured to determine an operating state of the coordinate measuring apparatus and to determine whether the determined operating state is an operating state that dynamically stresses the at least one air bearing and poses a risk to the coordinate measuring apparatus, and upon determining the risk to the coordinate measuring apparatus, increasing a compressed air supply to the at least one air bearing by the control system.

8. The method of claim 7, further comprising opening the valve when the flow rate detected by the flow rate meter increases.

9. The method of claim 7, further comprising:

providing the air bearing with at least one pressure sensor; and opening the valve when a pressure detected by the at least one pressure sensor decreases.

10. The method of claim 7, further comprising:

determining the operating state by at least one of detecting the flow rate of the compressed air through the at least one compressed air supply line to the air bearing, detecting operating commands for the coordinate measuring apparatus, and determining a pressure of the compressed air in the air bearing.

11. The method of claim 7, further comprising:

moving the two components that are movably mounted by the air bearing relative to one another according to predefined procedures, and storing the compressed air supply to the air bearing during each procedure to adjust an associated stored compressed air supply during an operation that corresponds to one of the predefined procedures.

12. The method of claim 7, further comprising:

determining a reference value or a characteristic curve for the flow rate of the compressed air, and performing an adjustment of the air bearing based on the reference value or the characteristic curve.

* * * * *